US012553496B2

(12) United States Patent
Smook

(10) Patent No.: US 12,553,496 B2
(45) Date of Patent: Feb. 17, 2026

(54) TILTABLY MOUNTED PLANET CARRIER

(71) Applicants: ZF FRIEDRICHSHAFEN AG, Friedrichshafen (DE); ZF Wind Power Antwerpen N.V., Lommel (BE)

(72) Inventor: Warren Smook, Huldenberg (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/702,361

(22) PCT Filed: Nov. 7, 2022

(86) PCT No.: PCT/EP2022/080953
§ 371 (c)(1),
(2) Date: Apr. 18, 2024

(87) PCT Pub. No.: WO2023/104409
PCT Pub. Date: Jun. 15, 2023

(65) Prior Publication Data

US 2025/0198483 A1 Jun. 19, 2025

(30) Foreign Application Priority Data

Dec. 7, 2021 (DE) ..................... 10 2021 213 855.1

(51) Int. Cl.
*F16H 1/28* (2006.01)
*F16H 57/08* (2006.01)
*F03D 15/10* (2016.01)

(52) U.S. Cl.
CPC ......... *F16H 1/2818* (2013.01); *F16H 57/082* (2013.01); *F03D 15/101* (2023.08); *F16H 1/2827* (2013.01)

(58) Field of Classification Search
CPC .... F16H 1/2818; F16H 57/082; F16H 1/2809; F16H 1/2863; F16H 57/10;
(Continued)

(56) References Cited

U.S. PATENT DOCUMENTS 4,090,416 A 5/1978 Hicks
5,269,733 A * 12/1993 Anthony, III ......... B25B 21/026 173/171

(Continued)

FOREIGN PATENT DOCUMENTS

DE 2539029 A1 3/1976
DE 102010029071 A1 11/2011

(Continued)

OTHER PUBLICATIONS

English translation of JPH09317833A; https://translationportal.epo.org; Mar. 31, 2025 (Year: 2025).*

(Continued)

*Primary Examiner* — Roger L Pang
(74) *Attorney, Agent, or Firm* — LEYDIG, VOIT & MAYER, LTD.

(57) ABSTRACT

An arrangement including a planetary stage, a shaft, a connecting element that forms a rotationally fixed connection of a planet carrier of the planetary stage to the shaft and is configured to be flexible with respect to tiltings of the planet carrier relative to the shaft, and a center axis of a ring gear of the planetary stage that is tilted relative to an axis of rotation of the shaft.

14 Claims, 1 Drawing Sheet

109 107 103 119 111 113 101 117 115 123 121 105 125

(58) Field of Classification Search
CPC .. F16H 2057/125; F16H 1/2827; F16H 57/12; F16H 2057/126; F03D 15/101; F05B 2260/40311
USPC ........................................ 475/331, 346, 347
See application file for complete search history.

(56) References Cited

U.S. PATENT DOCUMENTS

| | | | | |
|---|---|---|---|---|
| 7,011,598 | B2 * | 3/2006 | Flamang | F03D 15/10<br>475/331 |
| 7,828,682 | B2 * | 11/2010 | Smook | F16H 1/48<br>475/5 |
| 2022/0049629 | A1 * | 2/2022 | Sheridan | F02C 7/36 |
| 2023/0400093 | A1 * | 12/2023 | Mouly | F16H 1/2836 |

FOREIGN PATENT DOCUMENTS

| | | | |
|---|---|---|---|
| DE | 102017223356 | A1 | 6/2019 |
| DE | 102018206103 | A1 | 10/2019 |
| EP | 1855001 | A1 | 11/2007 |
| JP | H09317833 | A | 12/1997 |

OTHER PUBLICATIONS

English translation of DE102017223356A1; https://translationportal.epo.org; Mar. 31, 2025 (Year: 2025).*

* cited by examiner

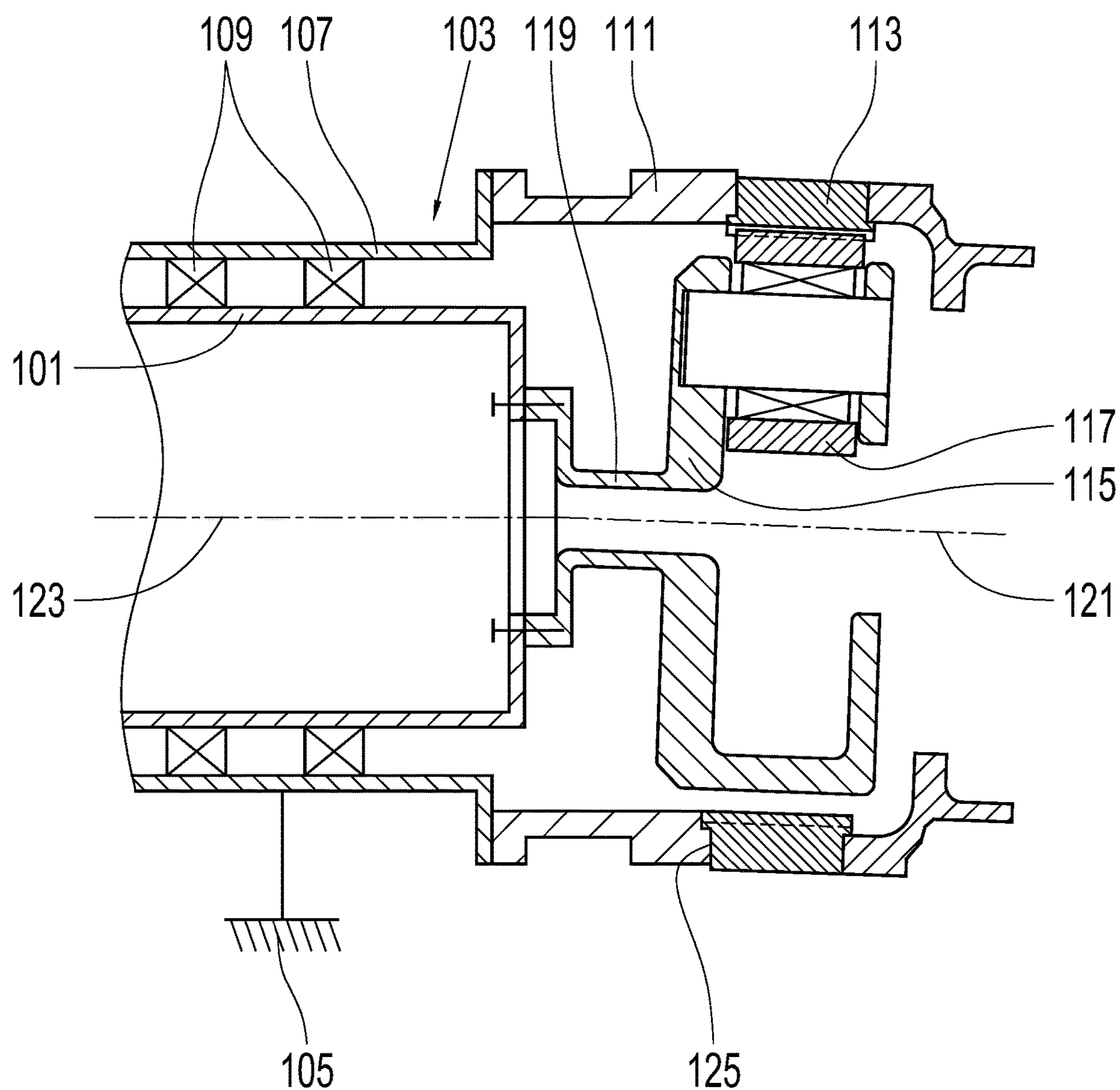
109
107
103
119
111
113
101
117
115
123
121
105
125

TILTABLY MOUNTED PLANET CARRIER

CROSS REFERENCE TO RELATED APPLICATIONS

This application is a U.S. National Phase application under 35 U.S.C. § 371 of International Application No. PCT/EP2022/080953, filed on Nov. 7, 2022, and claims benefit to German Patent Application No. DE 10 2021 213 855.1, filed on Dec. 7, 2021. The International Application was published in German on Jun. 15, 2023 as WO 2023/104409 A1 under PCT Article 21(2).

FIELD

The invention relates to an arrangement for a wind turbine gearbox.

BACKGROUND

DE 10 2017 223 356 A1 discloses a planet carrier that is connected to a shaft by means of a connecting element. The connecting element is configured to be flexible with respect to tiltings of the shaft and the planet carrier relative to one another. The shaft is mounted in a structure fixed to a housing. A ring gear, which is part of a planetary stage with the planet carrier, is fixed in the same structure. Due to the flexibility of the connecting element, the planet carrier is supported in the ring gear via planet gears. This results in increased loads in the teeth of the planet gears and the ring gear.

SUMMARY

In an embodiment, the present disclosure provides an arrangement including a planetary stage and a shaft. A connecting element forms a rotationally fixed connection of a planet carrier of the planetary stage to the shaft and is configured to be flexible with respect to tiltings of the planet carrier relative to the shaft. A center axis of a ring gear of the planetary stage is tilted relative to an axis of rotation of the shaft.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 illustrates a section of a gearbox.

DETAILED DESCRIPTION

In an embodiment, the invention provides for connecting a planet carrier to a shaft in a rotationally fixed manner, by bypassing the disadvantages inherent in the solutions known from the prior art.

The arrangement according to an embodiment of the invention comprises a planet carrier, a shaft and a connecting element. A planet carrier refers to a means for accommodating and mounting planet gears. The planet gears are rotatably mounted in the planet carrier. Together with the planet carrier, they form part of a planetary stage, which also includes a ring gear and a sun gear. The planet gears mesh with the ring gear and/or the sun gear. Exactly two of the three components-ring gear, planet carrier and sun gear—are rotatably mounted relative to a housing or a structure fixed to the housing, while the third component is rotationally fixed in the housing or the structure fixed to the housing.

This is suitable for use in a wind turbine gearbox, for example. Preferably, an input shaft of the wind power gearbox corresponds thereby to the said shaft.

The shaft is an element rotatably mounted in the housing or the structure fixed to the housing, which is configured to transmit torques. In particular, it can be an input shaft that transmits an input torque of a gearbox to the planet carrier.

The connecting element forms a rotationally fixed connection between the planet carrier and the shaft. Specifically, the connecting element is connected in a rotationally fixed manner to both the shaft and the planet carrier. There are therefore rotationally fixed connections between the connecting element and the shaft and between the connecting element and the planet carrier. In particular, the connecting element can be formed with the shaft and/or the planet carrier.

The connecting element is configured to be flexible with respect to tiltings of the planet carrier relative to the shaft. Tiltings refer to rotations around a radial axis, i.e. an axis orthogonal to an axis of rotation of the shaft and the planet carrier. In the tilted state, an axis of rotation of the shaft and the planet carrier run antiparallel to each other. An angle that the two axes of rotation comprise in the tilted state is different from 180°. In the tilted state, the two axes of rotation are therefore not aligned.

A connecting element according to an embodiment of the invention configured to be flexible with respect to tiltings is an element that is configured to be flexible with respect to tiltings by means of design measures. In particular, its flexibility towards tiltings is greater than the flexibility of the input shaft and the planet carrier. The connecting element can offer resistance to the tiltings. However, this resistance is less than the resistance that the input shaft and the planet carrier offer to the same tiltings. The connecting element therefore acts as a torsion spring whose spring axis is orthogonal to the axis of rotation of the input shaft and the planet carrier.

The flexibility of the connecting element can be realized in various ways. Corresponding further embodiments are described in DE 10 2017 223 356 A1, the content of which is therefore incorporated herein by reference.

In order to prevent the planet carrier from being supported via its planet gears in a toothing of the ring gear, a central axis of the ring gear is tilted relative to the axis of rotation of the shaft in accordance with an embodiment of the invention. The central axis of the ring gear and the axis of rotation of the shaft are therefore not aligned and do not run parallel to each other, but are at an angle relative to each other that deviates from the 180°angle. Starting from an aligned course of the two axes of rotation, they are rotated relative to each other about an axis that runs radially, i.e. orthogonally to the center axis of the ring gear and the axis of rotation of the shaft.

The center axis of the ring gear is identical to a toothing axis of its toothing. It is characterized by the fact that the ring gear is rotationally symmetrical with regard to a rotation around several angles about the central axis. The number of angles corresponds to the number of teeth of the ring gear. The ring gear can be arranged in a rotationally fixed manner or a rotatable manner with respect to a housing or a structure fixed to the housing. In the latter case, the center axis of the ring gear is identical to its axis of rotation.

The tilting of the ring gear according to an embodiment of the invention makes it possible to adjust the position of the ring gear to a tilting of the planet carrier. This prevents the planet carrier from being supported via its planet gears in the toothing of the ring gear. This relieves the load on the meshing toothings of the planet gears and the ring gear and a more balanced distribution of the loads acting on the individual tooth flanks is achieved.

In a preferred embodiment, the shaft carries the planet carrier via the connecting element. This means that the weight acting on the planet carrier is at least partially supported in the shaft via the connecting element. The weight acting on the planet carrier includes its own weight, the weight of its planet gears, planet bolts and planet bearings.

According to an embodiment, the planet carrier is at least partially mounted via the bearings of the shaft. This makes it possible to save on bearings for the planet carrier. Their function is taken over by the shaft in accordance with an embodiment.

In a preferred embodiment, the planet carrier is carried exclusively by the shaft. This means that the planet carrier has no bearings of its own, but is mounted exclusively via the bearings of the shaft. In accordance with an embodiment its weight is supported entirely via the connecting element on the shaft.

The elimination of bearings of the planet carrier enables the planet carrier to align itself with the toothings of the ring gear and a sun gear of the same planetary stage. This improves the load-bearing behavior of the toothings. However, the weight acting on the planet carrier causes its center axis to tilt relative to the axis of rotation of the shaft. As described above, this tilting is compensated for by embodiments of the invention.

In a preferred development, the tilting of the ring gear orients itself with the tilting of the planet carrier. According to an embodiment, the center axis of the ring gear is therefore tilted relative to the axis of rotation of the shaft by the same angle by which a center axis of the planet carrier is tilted relative to the axis of rotation of the shaft. In particular, the center axis of the planet carrier can be tilted relative to the axis of rotation of the shaft as a result of the weight acting on the planet carrier. According to an embodiment, the central axis of the ring gear and the central axis of the planet carrier run parallel to each other. In particular, the two axes can be coincidental. An embodiment enables a complete compensation of the deformations of the connecting element caused by the weight due to its flexibility.

The section shown in FIG. 1 is part of a wind turbine gearbox. An input shaft 101 of this gearbox is mounted in a housing 103. The housing 103 is in turn fixed in a nacelle 105 of the wind turbine.

The housing 103 includes an input shaft housing 107, in which bearings 109 of the input shaft 101 are attached, and an intermediate piece 111. A ring gear 113 forms a further part of the housing 107, which is fixed in the input shaft housing 107 via the intermediate piece 111.

The ring gear 113 belongs to a planetary stage together with a planet carrier 115, planet gears 117, which are rotatably mounted in the planet carrier 115, and a sun gear. The planet gears 117 mesh with the ring gear 113 and the sun gear.

The planet carrier 115 forms a connecting element 119. This is screwed into the input shaft 101. The planet carrier 115 does not have its own bearing, but is fully supported in the input shaft 101 via the connecting element 119.

As described in DE 10 2017 223 356 A1, the connecting element 119 is configured to be flexible with respect to tiltings of the planet carrier 115 relative to the input shaft 101. This results in a tilting of the planet carrier 115 due to the weight, so that an axis of rotation 121 of the planet carrier 115 and an axis of rotation 123 of the input shaft 101 are not aligned with each other. This misalignment is compensated for by a corresponding tilting of the ring gear 113. The ring gear 113 is tilted in such a way that its center axis corresponds to the axis of rotation 121 of the planet carrier 115.

Preferably, the ring gear 113, like a conventional ring gear, is configured to be rotationally symmetrical to its center axis. The tilting of the ring gear 113 is achieved by adapting the intermediate piece 111. Thus, a flange 125, which the intermediate piece 111 forms for accommodating and fixing the ring gear 113, is tilted relative to the axis of rotation 123 of the input shaft 101 in such a way that a central axis of the flange 185 corresponds to the axis of rotation 121 of the planet carrier 115.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 input shaft
103 housing
105 nacelle
107 input shaft housing
109 bearing
111 intermediate piece
113 ring gear
115 planet carrier
117 planet gear
119 connecting element
121 axis of rotation of the planet carrier
123 axis of rotation of the input shaft

125 flange

The invention claimed is:

1. An arrangement comprising:
a planetary stage;
a shaft;
a connecting element that forms a rotationally fixed connection of a planet carrier of the planetary stage to the shaft and is configured to be flexible with respect to tiltings of the planet carrier relative to the shaft; and
a center axis of a ring gear of the planetary stage that is tilted relative to an axis of rotation of the shaft,
wherein the connection element comprises a flexible hollow shaft that is rotationally fixed to the shaft at a first end and the planet carrier at a second end.

2. The arrangement according to claim 1, wherein
the shaft carries the planet carrier via the connecting element.

3. The arrangement according to claim 1, wherein the planet carrier is carried exclusively by the shaft.

4. The arrangement according to claim 1, wherein the center axis of the ring gear is tilted relative to the axis of rotation of the shaft by a same angle by which a center axis of the planet carrier is tilted relative to the axis of rotation of the shaft as a result of weight acting on the planet carrier.

5. The arrangement according to claim 1, wherein the ring gear is fixed to a housing that is coaxial with the shaft.

6. The arrangement of claim 5, wherein the housing is always coaxial with the shaft.

7. The arrangement of claim 1, wherein the center axis of the ring gear of the planetary stage is always tilted relative to the axis of rotation of the shaft.

8. An arrangement comprising:
a planetary stage;
a shaft;
a connecting element that forms a rotationally fixed connection of a planet carrier of the planetary stage to the shaft and is configured to be flexible with respect to tiltings of the planet carrier relative to the shaft;
a center axis of a ring gear of the planetary stage that is tilted relative to an axis of rotation of the shaft, wherein the ring gear is fixed to a housing that is coaxial with the shaft.

9. The arrangement of claim 8, wherein the center axis of the ring gear of the planetary stage is always tilted relative to the axis of rotation of the shaft.

10. The arrangement of claim 8, wherein the housing is always coaxial with the shaft.

11. The arrangement according to claim 8, wherein
the shaft carries the planet carrier via the connecting element.

12. The arrangement according to claim 8, wherein the planet carrier is carried exclusively by the shaft.

13. The arrangement according to claim 8, wherein the center axis of the ring gear is tilted relative to the axis of rotation of the shaft by a same angle by which a center axis of the planet carrier is tilted relative to the axis of rotation of the shaft as a result of weight acting on the planet carrier.

14. The arrangement according to claim 8, wherein the connection element comprises a flexible hollow shaft that is rotationally fixed to the shaft at a first end and the planet carrier at a second end.

* * * * *